March 19, 1968   D. M. SHEROCK   3,373,647
COIL SPRING EXPANSION FASTENER
Filed March 8, 1966
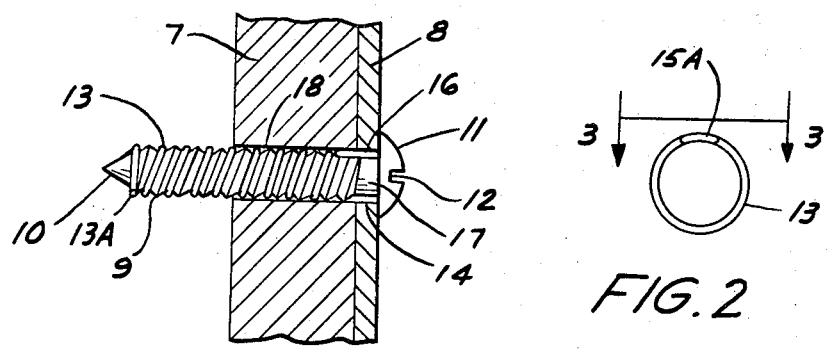
FIG. 1
FIG. 2
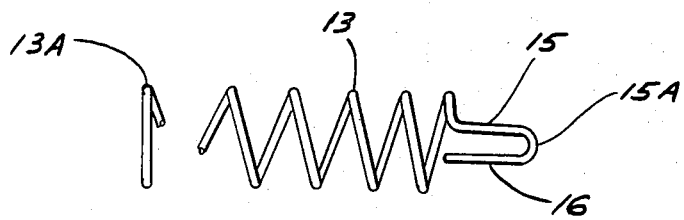
FIG. 3
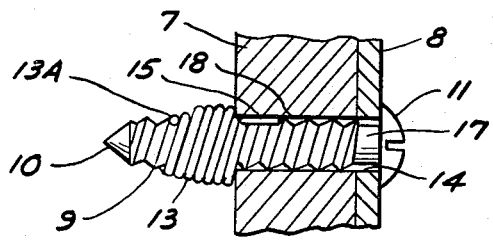
FIG. 4
DUANE M. SHEROCK
INVENTOR.
BY Edward M. Apple
ATTORNEY United States Patent Office 3,373,647
Patented Mar. 19, 1968

3,373,647
COIL SPRING EXPANSION FASTENER
Duane M. Sherock, 32190 Five Mile Road,
Livonia, Mich. 48154
Filed Mar. 8, 1966, Ser. No. 532,810
1 Claim. (Cl. 85—64)

ABSTRACT OF THE DISCLOSURE

This application discloses a fastening device consisting of a threaded element having an expansion spring wound concentrically thereon, the spring having an axial extension and return portion at one end and a loop at the opposite end, the extension and return portion being arranged to hold the spring against rotation and the loop being arranged to move along the threaded member upon rotation thereof, to expand radially and contract longitudinally the spring, when rotated in one direction and to expand longitudinally and contract radially the spring, when rotated in the opposite direction.

This invention relates to fastening devices and has particular reference to a device comprising a screw and a concentrically wound expansion spring for securing an object to a wall, or for securing one wall panel to another.

An object of the invention is to generally improve fastening devices and to provide a device which is simple in construction, economical to manufacture and efficient in operation.

Another object of the invention is the provision of a fastening device which consists of a threaded member having an expansion spring concentric therewith and arranged so that the convolutions of the spring ride between the threads of the threaded member, whereby upon rotation of the threaded member in one direction the spring is expanded, and upon rotation of the threaded member in the opposite direction the spring is contracted.

Another object of the invention is to provide a fastening device which consists of a threaded member which has a pointed leading end so that the same may be driven into wood, or other comparatively soft material, the said threaded element having an expansion spring with its convolutions received between the threads of the threaded member, the said spring having an axial extension with a return portion at one end, which extension and return portion are received in axial relation along one section of the threaded member.

Another object of the invention is the provision of a device of the character indicated in which the normal outside diameter of the expansion spring is substantially the same as the outside diameter of the threaded member so that the assembly of the threaded member and the expansion spring may be driven into a wooden panel, or other comparatively soft material.

Another object of the invention is the provision of a combined threaded element, having a head thereon, and an expansion spring concentric therewith, the said expansion spring having an axial extension with a return portion thereon, which is arranged to be received alongside a section of said threaded element near said head, the said axial extension and return portion serving as an abutment to prevent the rotation of the expansion spring when the assembly is driven into a wall, or the like, and the threaded element is then rotated.

I am aware of the fact that others have devised fastening means employing threaded members and expansion members to effect the securing of one object to another, but I am not aware of the fact that anybody heretofore has ever used a threaded element having a pointed leading end so that the assembly may be driven into wood or other comparatively soft material. Nor am I aware of the fact that such devices heretofore known to the public ever employed an axial extension and return portion which serves as an abutment to prevent the rotation of the spring when the threaded element is rotated.

In the devices heretofore known to the public other elements are usually employed with the threaded member and the expansion member to effect the anchoring action, with the result that the devices heretofore known to the public have been comparatively expensive to manufacture and were unhandy to use.

It is therefore an object of this invention to obviate such difficulties and to provide other advantages.

The foregoing and other objects and advantages of the invention will become more apparent as the description proceeds, reference being made from time to time to the accompanying drawing, forming part of the within disclosure, in which drawing:

FIG. 1 is a vertical section taken through a wall section to which a bracket is attached by means of a device embodying the invention.

FIG. 2 is a right end elevational view of the expansion spring shown in FIG. 1.

FIG. 3 is a top plan view of the expansion spring shown in FIG. 2.

FIG. 4 is a section similar to FIG. 1, but showing the spring after the screw has been rotated.

Referring now more particularly to the drawing, it will be understood that in the embodiment herein disclosed the reference character 7 indicates a section of a wall which may be made of wood, plaster board, or other comparatively soft material into which a pointed object may be driven.

The reference character 8 indicates a metal bracket, or other object which it is desired to be fastened to the wall 7 by means of the invention device.

The device embodying the invention resides in the provision of a threaded member 9 which is provided with a sharp pointed leading end 10 and a head 11, which may have a slot 12 therein for receiving a screw driver, or which may be in the form of a square, hexagonal, or other shaped head, so that the threaded element may be turned with a wrench or similar tool.

Positioned on the threaded member 9 is an expansion spring 13, the convolutions of which are received between the threads of the member 9. The spring 13 is formed with an end loop 13A which is received on the threaded member 9 near its pointed end 10.

The normal outside diameter of the expansion spring 13 is preferably no greater than the outside diameter of the threads of the member 9 so that the assembled threaded member 9, and expansion spring 13, may be driven into any comparatively soft material as wood, plaster board, and the like, by pounding the head 11 in the same manner as a nail may be driven.

It will be understood that when a metallic object such as a metal bracket 8 is to be secured to the wall 7 a suitable hole 14 must be drilled in the metal member 8 before the fastening device is inserted. The hole 14 should be of the same diameter as the normal diameter of the expansion spring 13 and the outside diameter of the threaded member 9.

It will be noted that the expansion spring 13 (FIG. 3) is also provided with an axial extension 15 and a return portion 16, which elements 15 and 16 normally lie in axial relation along the unthreaded portion 17 of the threaded member 9. The spaced elements 15 and 16, which normally rest in the same plane, when driven into the hole 14 of the bracket 8 and into the bore 18, previously formed in the wall section 7 by drilling or by driving the assembly therethrough, will serve as a spring abutment to anchor the expansion spring 13 against rotation when the threaded element 9 is rotated. The web portion 15A of the extension 15 will take the curvature of the member 9, when the latter is driven into the holes. This will effect a spring tension on the elements 15 and 16 to secure the spring against rotation.

The threaded member 9 may have either a left hand thread or a right hand thread. In any event with the trailing end of the spring 13 anchored by means of the elements 15 and 16, the rotation of the threaded member 9 in one direction will cause the spring 13 to contract because the loop end 13A will move along the threads, and when rotated in the opposite direction will cause the spring to expand.

The contraction of the spring 13, of course, will shorten its overall length and will tend to increase its diameter, causing the convolutions of the spring to bite into the material comprising the wall 7 and will cause the convolutions of the spring beyond the face of the wall to become greater than the diameter of the bore 18 and will prevent the threaded member 9 from being withdrawn, and the rotation of the threaded member in the opposite direction will cause the elongation of the spring and the reduction of its diameter and the freeing of the spring from the wall, so that the device may easily be removed from the wall, after a light prying action between the head 11 and the bracket 8 to the effect the loosening of the elements 15 and 16.

From the foregoing it will be seen that I have provided a fastening element which has some of the advantages of both a nail and a screw, together with the expansion and contraction qualities of the spring member.

It is believed that the operation of the device is obvious from the foregoing description.

Having described my invention, what I claim and desire to secure by Letters Patent is:

1. A fastening device comprising in combination, a threaded member of substantially uniform diameter, and having a head at one end and a sharp point at the other end, and having comparatively deep threads, there being an expansion spring concentrically mounted on said threaded member and having its convolutions in engagement with said threads, the said spring having an axial extension and return portion at one end and received on said threaded element near the head, which said axial extension and return portions serve as means to hold said spring against rotation on the threaded member after the assembly is driven into a wall, or the like, the opposite end of the said spring being provided with a loop which is arranged to move along the threads of the threaded element, whereby upon rotation of the threaded element in one direction the spring is contracted longitudinally and expanded radially, and upon rotation of the threaded member in the opposite direction the spring is expanded longitudinally and contracted radially.

References Cited

UNITED STATES PATENTS

| 2,520,232 | 8/1950 | Bereza | 85—64 |
| 2,691,951 | 10/1954 | Hansen | 85—32 |
| 2,837,005 | 6/1958 | Gaul | 85—64 |
| 3,302,509 | 2/1967 | Modrey | 85—64 |

FOREIGN PATENTS 549,789   10/1956   Italy.

MARION PARSONS, JR., *Primary Examiner.*

CARL W. TOMLIN, *Examiner.*